United States Patent
Siler et al.

(10) Patent No.: US 6,813,970 B2
(45) Date of Patent: Nov. 9, 2004

(54) BALL-NUT ASSEMBLY AND METHOD FOR MAKING

(75) Inventors: Ernest R. Siler, Springboro, OH (US); David B. Drennen, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 62 days.

(21) Appl. No.: 10/001,715

(22) Filed: Nov. 15, 2001

(65) Prior Publication Data

US 2003/0089188 A1 May 15, 2003

(51) Int. Cl.⁷ ............................................. F16H 25/22
(52) U.S. Cl. .................. 74/424.87; 74/424.86; 74/424.82
(58) Field of Search .................. 74/424.81, 424.82, 74/424.83, 424.84, 424.85, 424.86, 424.87, 424.88; 29/507, 512, 522.1, 523, 524

(56) References Cited

U.S. PATENT DOCUMENTS

| | | | | |
|---|---|---|---|---|
| 2,121,464 A | * | 6/1938 | Zagorski | 29/512 |
| 2,628,869 A | * | 2/1953 | Whitcomb, Jr. | 29/512 |
| 2,905,124 A | * | 9/1959 | Henchert | 29/512 |
| 3,205,001 A | * | 9/1965 | Abolins | 29/522.1 |
| 3,290,077 A | * | 12/1966 | La Barge | 29/522.1 |
| 3,850,046 A | * | 11/1974 | Nilsson | 74/424.87 |
| 3,913,421 A | * | 10/1975 | Hawkins | 29/512 |
| 4,357,838 A | * | 11/1982 | Blaurock et al. | 74/424.87 |
| 5,375,323 A | * | 12/1994 | Sata | 29/507 |
| 5,482,312 A | * | 1/1996 | Maurer | 280/728.1 |
| 5,937,700 A | * | 8/1999 | Brown et al. | 74/424.86 |
| 6,112,610 A | * | 9/2000 | Welling | 74/424.86 |
| 6,439,338 B2 | * | 8/2002 | Yoshioka | 74/424.83 |
| 6,454,042 B1 | * | 9/2002 | Yoshida et al. | 74/424.83 |

FOREIGN PATENT DOCUMENTS

FR 2 703 122 A1 * 9/1994

* cited by examiner

Primary Examiner—Thomas Williams
(74) Attorney, Agent, or Firm—Michael D. Smith

(57) ABSTRACT

A ball-nut assembly includes a ball nut and a crossover member. The ball nut incudes a radial through slot and an outer surface. The outer surface has a first portion, has a ledge radially recessed from the first portion and at least partially bounding the through slot, and has an undercut wall connecting the ledge and the first portion. The crossover member has a flange and a crossover-grooved portion. A method for making a ball-nut assembly positions the crossover member from outside the ball nut to have the flange supported by the ledge and the crossover-grooved portion located in the through slot. The method also deforms the flange creating a staked portion of the flange which contacts the undercut wall of the outer surface of the ball nut.

6 Claims, 6 Drawing Sheets

BALL-NUT ASSEMBLY AND METHOD FOR MAKING

TECHNICAL FIELD

The present invention relates generally to ball screws and ball nuts, and more particularly to a ball-nut assembly having a crossover member and to a method for making a ball-nut assembly having a crossover member.

BACKGROUND OF THE INVENTION

Conventional automotive braking systems include those which use a ball-screw-and-ball-nut assembly, wherein the brake booster serves as a housing, wherein the ball screw is turned by a gear driven by an electric brake caliper motor, wherein the ball nut is connected to the brake pad, and wherein rotation of the ball screw axially moves the ball nut. In some known ball-nut assemblies, an exterior tube extending above the ball nut serves as a crossover for the balls, as is known to the artisan. However, such exterior tubes demand close part tolerances which are expensive and difficult to achieve. Also, such protruding exterior tubes are not suitable for certain applications such as being housed in a brake caliper housing. In other known ball-nut assemblies, an internal crossover member is used which is inserted into a radial through slot of the ball nut from inside the ball nut, which abuts a radially-inward-facing ledge of the ball nut surrounding the through slot, and which floats while being captured between the ball screw and the ball nut as is known to the artisan. Such internal crossovers are suitable for many applications including being housed in an automotive brake booster. However, such internal crossovers demand close part tolerances which are expensive and difficult to achieve. If close tolerances are not achieved, the ball screw and ball nut assembly will not work as is known to the artisan.

What is needed is a ball-nut assembly, and a method for making a ball nut assembly, which uses an internal crossover member but which does not require close part tolerances to ensure proper operation of a ball-screw-and-ball-nut assembly.

SUMMARY OF THE INVENTION

A first expression of a first embodiment of the invention is for a ball-nut assembly including a ball nut and a crossover member. The ball nut includes a radial through slot and includes an outer surface having a first portion, having a ledge radially recessed from the first portion and at least partially bounding the through slot, and having an undercut wall connecting the ledge and the first portion. The crossover member has a flange supported by the ledge and has a crossover-grooved portion positioned in the through slot, wherein the flange has at least one deformed portion contacting the undercut wall of the outer surface of the ball nut.

A second expression of a first embodiment of the invention is for a ball-screw-and-ball-nut assembly including a ball nut, a crossover member, a ball screw and balls. The ball nut includes an inside helical groove, includes a radial through slot, and includes an outer surface having a first portion, having a ledge radially recessed from the first portion and at least partially bounding the through slot, and having an undercut wall connecting the ledge and the first portion. The crossover member has a flange supported by the ledge and has a crossover-grooved portion positioned in the through slot, wherein the flange has at least one deformed portion contacting the undercut wall of the outer surface of the ball nut. The ball screw includes an outside helical groove and is positioned inside the ball nut. The balls contact the crossover-grooved portion of the crossover member and a portion of the inside and outside helical grooves.

A first method of the invention is for making a ball-nut assembly and includes steps a) through d). Step a) includes obtaining a ball nut including a radial through slot and including an outer surface having a first portion, having a ledge radially recessed from the first portion and at least partially bounding the through slot, and having an undercut wall connecting the ledge and the first portion. Step b) includes obtaining a crossover member having a flange and a crossover-grooved portion. Step c) includes positioning the crossover member from outside the ball nut to have the flange supported by the ledge and the crossover-grooved portion disposed in the through slot. Step d) includes deforming the flange creating a staked portion of the flange which contacts the undercut wall of the outer surface of the ball nut. In one example, the first method also includes after step a) and before step c) the step on aligning the ball nut on a locating arbor which simulates balls placed around a ball screw and wherein step c) includes aligning the crossover member on the locating arbor and step d) includes using a stake punch.

Several benefits and advantages are derived from one or more of the first method and the first and second expressions of a first embodiment of the invention. The example which includes the locating arbor, which simulates balls placed around a ball screw for proper alignment of the crossover member on the ball nut, enables close assembly tolerances for inexpensive components that can be manufactured with loose part tolerances, as can be appreciated by those skilled in the art. Once properly aligned, the example which includes the stake punch deforms and stakes the crossover member to the undercut wall of the ball nut to maintain the crossover member in proper aligned attachment to the ball nut for smooth operation of a ball-screw-and-ball-nut assembly.

DESCRIPTION OF THE PREFERRED EMBODIMENTS

Figure 1:
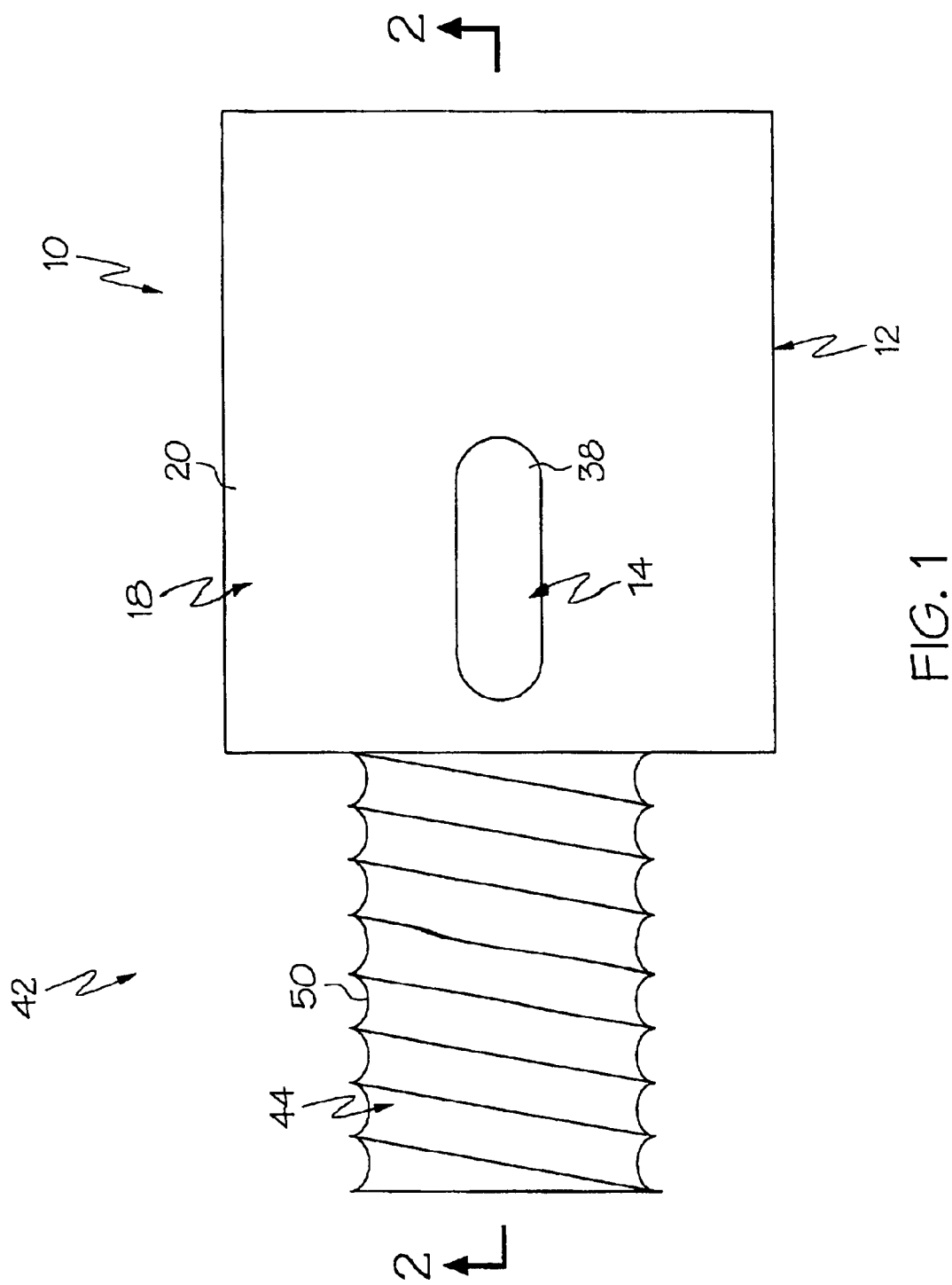
FIG. 1 is a top planar view of a first embodiment of a ball-nut assembly (including a crossover member) and of a ball-screw-and-ball-nut assembly of the invention.
Figure 2:
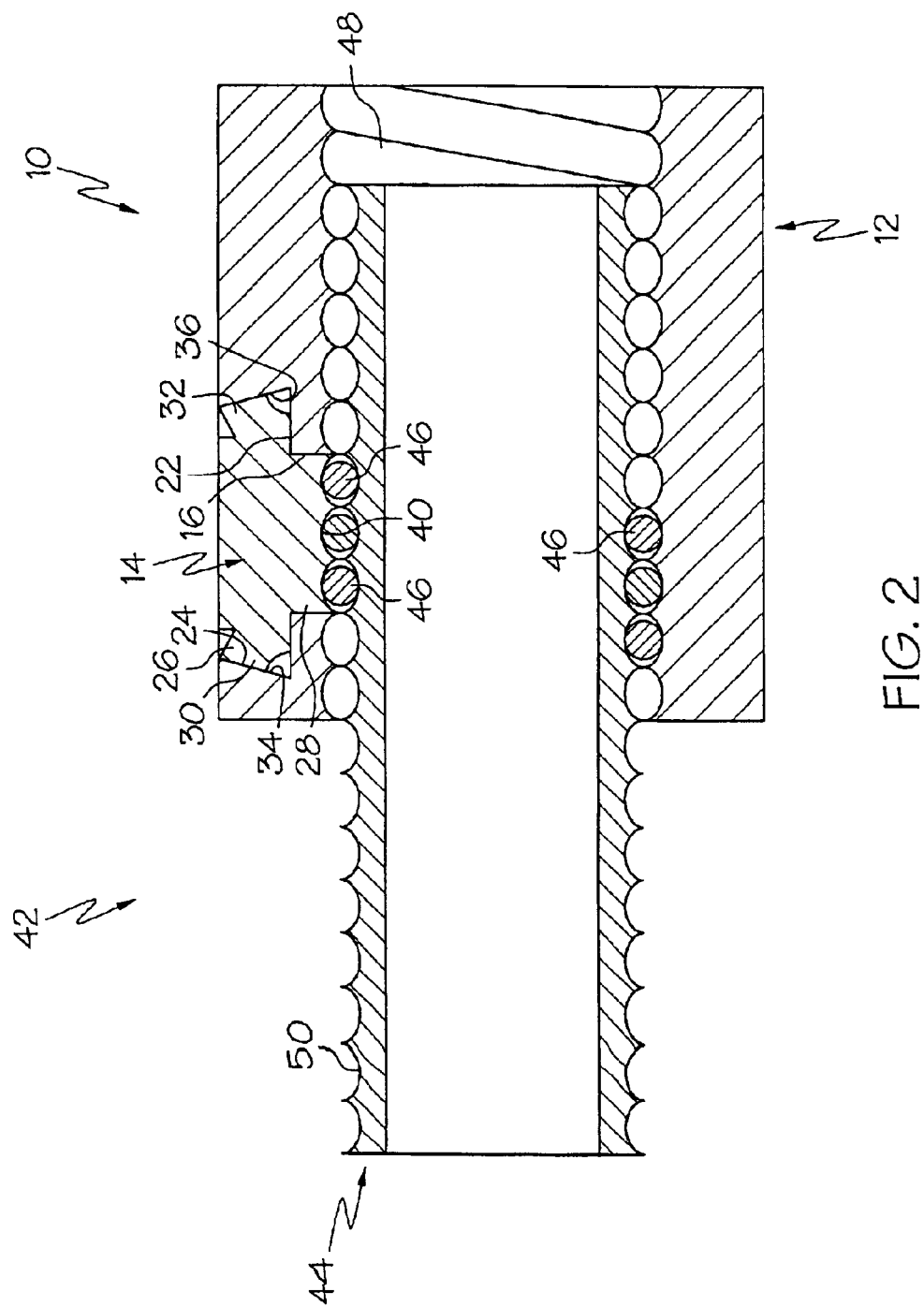
FIG. 2 is cross-sectional view of the ball-nut assembly and the ball-screw-and-ball-nut assembly of FIG. 1 taken along lines 2—2 of FIG. 1.
Figure 4:
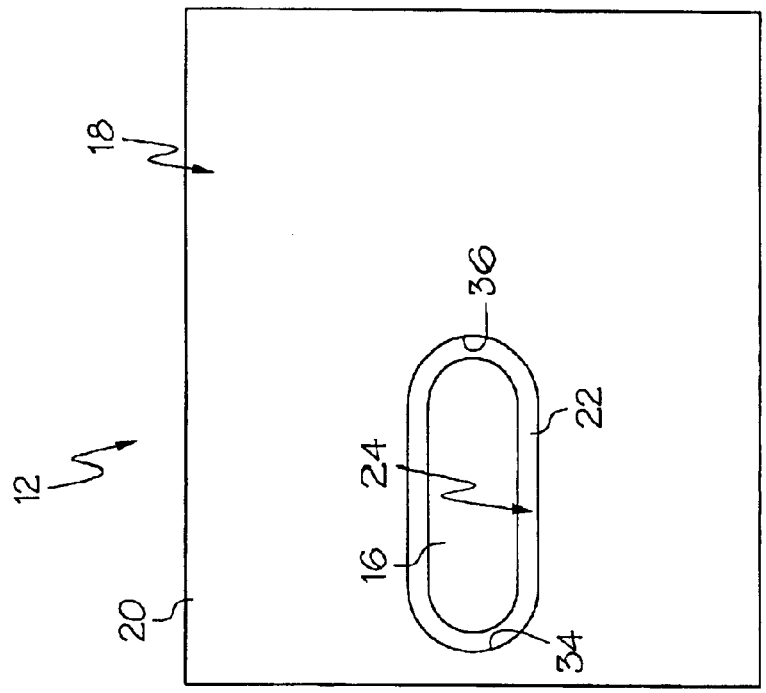
FIG. 4 is a view, as in FIG. 1, but of only the ball nut and with the crossover member of the ball-nut assembly removed.
Figure 3:
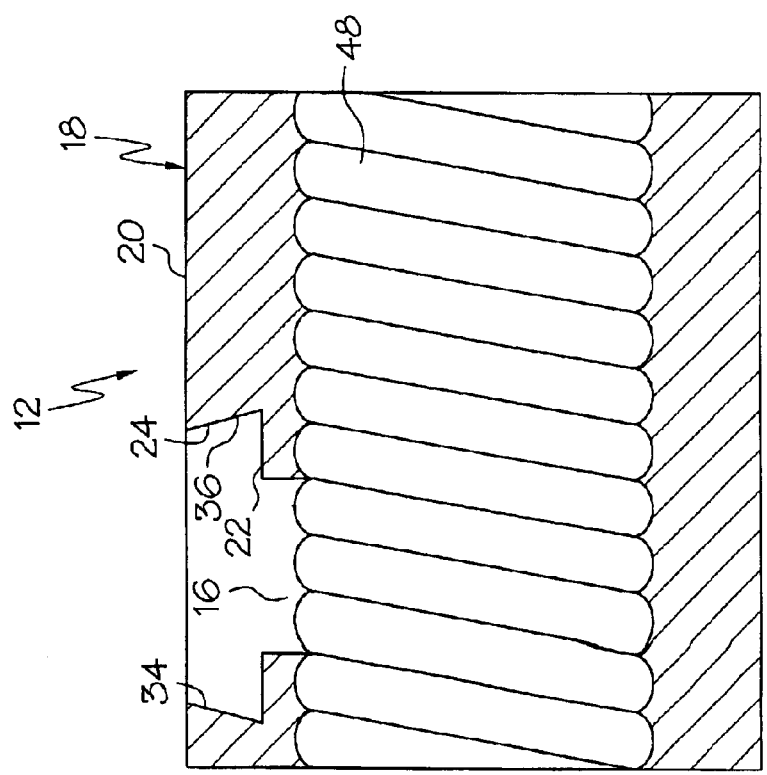
FIG. 3 is a view, as in FIG. 2, but of only the ball nut and with the crossover member of the ball-nut assembly removed.
Figure 5:
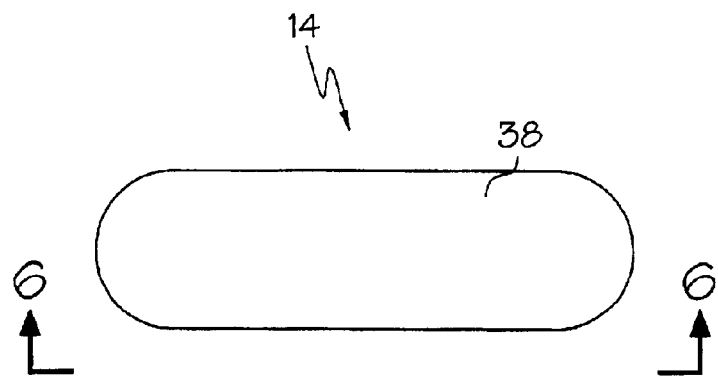
FIG. 5 is an enlarged, top planar view of the crossover member of FIGS. 1 and 2.
Figure 6:
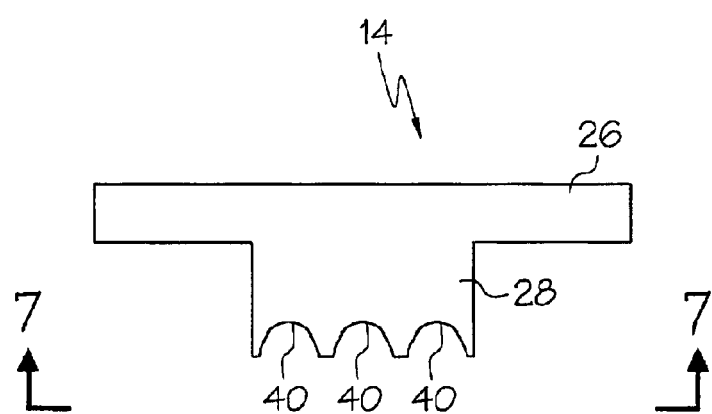
FIG. 6 is a side elevational view of the crossover member of FIG. 5 taken along lines 6—6 of FIG. 5.
Figure 7:
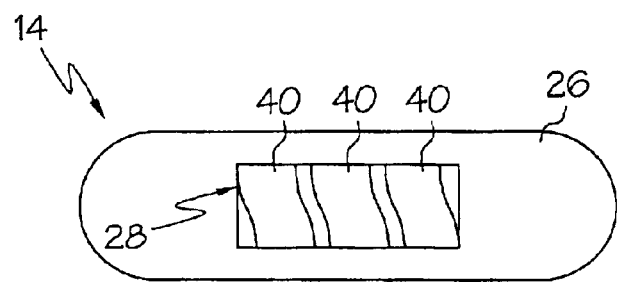
FIG. 7 is a bottom planar view of the crossover member of FIG. 6 taken along lines 7—7 of FIG. 6.

Referring now to the drawings, FIGS. 1–7 illustrate a first embodiment of the present invention. A first expression of the first embodiment shown in FIGS. 1–7 is for a ball-nut assembly 10 including a ball nut 12 and a crossover member 14. The ball nut 12 includes a radial through slot 16 and includes an outer surface 18. The outer surface 18 has a first portion 20, has a ledge 22 radially recessed from the first portion 20 and at least partially bounding the through slot 16, and has an undercut wall 24 connecting the ledge 22 and the first portion 20. By "undercut wall 24" is meant that the undercut wall 24 tilts inward toward the through slot 16 as one moves along the undercut wall 24 from the ledge 22 to the first portion 20 as best seen in FIG. 3. The crossover member 14 has a flange 26 supported by the ledge 22 and has a crossover-grooved portion 28 disposed in the through slot 16, wherein the flange 26 has at least one deformed portion 30 and 32 contacting the undercut wall 24 of the outer surface 18 of the ball nut 12. In one arrangement, the contact of the at-least-one deformed portion 30 and 32 with the undercut wall 24 is a staked contact.

In one example of the first expression, the ledge 22 has an annular shape, surrounds the through slot 16, and annularly supports the flange 26. In one modification, the undercut wall 24 has axially-opposing first and second end portions 34 and 36, and the at-least-one deformed portion 30 and 32 includes first and second deformed portions 30 and 32 respectively contacting a corresponding one of the first and second end portions 34 and 36 of the undercut wall 24. In one construction, the first portion 20 has a cylindrical shape. In one variation, the crossover member 14 has a flat outward facing surface 38 disposed below the first portion 20 of the outer surface 18 of the ball nut 12 which allows the use of an inwardly-protruding pin (not shown) from a surrounding housing (such as an electric brake caliper housing, not shown) to sideways engage the undercut wall 24 (above the crossover member 14) preventing rotation of the ball nut 12 when such rotation is not desired. In one application, the ball nut 12 is a vehicle-brake-pad-driving ball nut.

In the same or different example of the first expression, the ball nut 12 is essentially non-ductile, and the crossover member 14 has an elongation ductility of at least four percent. In one construction, the crossover member 14 consists essentially of aluminum, and the ball nut 12 consists essentially of steel. In one implementation, the crossover member 14 is a net shape component meaning that it is a molded (such as, but not limited to, using powdered metallurgy techniques), die-cast, or stamped component. In one application, the tolerances for making the crossover member 14 are substantially twenty thousandths of an inch. In one modification, the undercut wall 24 makes an angle of substantially five to ten degrees (and in one variation substantially seven degrees) from vertical. In one design, the crossover-grooved portion 28 of the crossover member 14 has three crossover grooves 40.

A second expression of the first embodiment shown in FIGS. 1–7 is for a ball-screw-and-ball-nut assembly 42 including a ball nut 12, a crossover member 14, a ball screw 44, and a plurality of balls 46. The ball nut 12 includes an inside helical groove 48, includes a radial through slot 16, and includes an outer surface 18. The outer surface 18 has a first portion 20, has a ledge 22 radially recessed from the first portion 20 and at least partially bounding the through slot 16, and has an undercut wall 24 connecting the ledge 22 and the first portion 20. The crossover member 14 has a flange 26 supported by the ledge 22 and has a crossover-grooved portion 28 disposed in the through slot 16, wherein the flange 26 has at least one deformed portion 30 and 32 contacting the undercut wall 24 of the outer surface 18 of the ball nut 12. The ball screw 44 includes an outside helical groove 50 and is disposed inside the ball nut 12. The balls 46 contact the crossover-grooved portion 28 of the crossover member 14 and a portion of the inside and outside helical grooves 48 and 50. It is noted that the balls 46 are always axially bounded by the crossover-grooved portion 28 of the crossover member 14, as is understood by the artisan.

In one application, the ball screw 44 is an electric-motor-driven ball screw, and the ball nut 12 is a vehicle-brake-pad-driving ball nut. The entire previous multi-paragraph discussion of the first expression of the ball-nut assembly 10 is equally applicable to the second expression of the ball-screw-and-ball-nut assembly 42.

Figure 8:
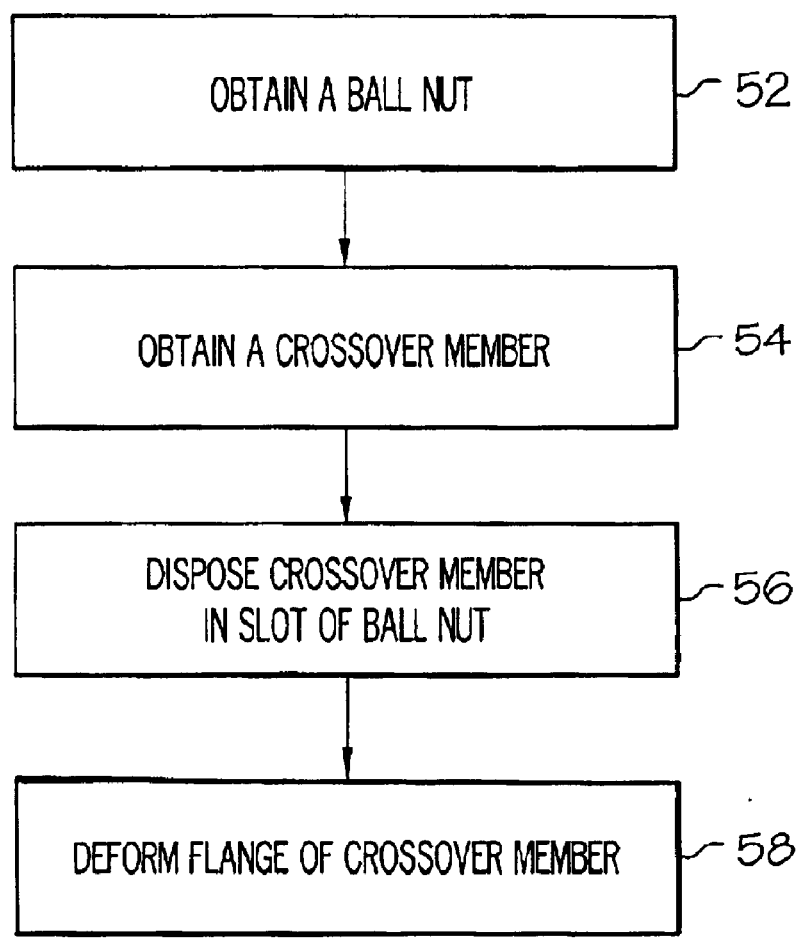
FIG. 8 is a block diagram of a first method of making a ball-nut assembly.

A first method of the invention is for making a ball-nut assembly 10 and is shown in FIG. 8. The first method includes steps a) through d). Step a) is labeled in block 52 of FIG. 8 as "Obtain A Ball Nut". Step a) includes obtaining a ball nut 12 including a radial through slot 16 and including an outer surface 18 having a first portion 20, having a ledge 22 radially recessed from the first portion 20 and at least partially bounding the through slot 16, and having an undercut wall 24 connecting the ledge 22 and the first portion 20. Step b) is labeled in block 54 of FIG. 8 as "Obtain A Crossover Member". Step b) includes obtaining a crossover member 14 having a flange 26 and a crossover-grooved portion 28. Step c) is labeled in block 56 of FIG. 8 as "Dispose Crossover Member In Slot Of Ball Nut". Step c) includes disposing the crossover member 14 from outside the ball nut 12 to have the flange 26 supported by the ledge 22 and the crossover-grooved portion 28 disposed in the through slot 16. Step d) is labeled in block 58 of FIG. 8 as "Deform Flange Of Crossover Member". Step d) includes deforming the flange 26 creating a staked portion (e.g., the at-least-one deformed portion 30 and 32) of the flange 26 which contacts the undercut wall 24 of the outer surface 18 of the ball nut 12. It is noted that, in this method, the contact of the at-least-one deformed portion 30 and 32 with the undercut wall 24 is a staked contact.

Figure 9:
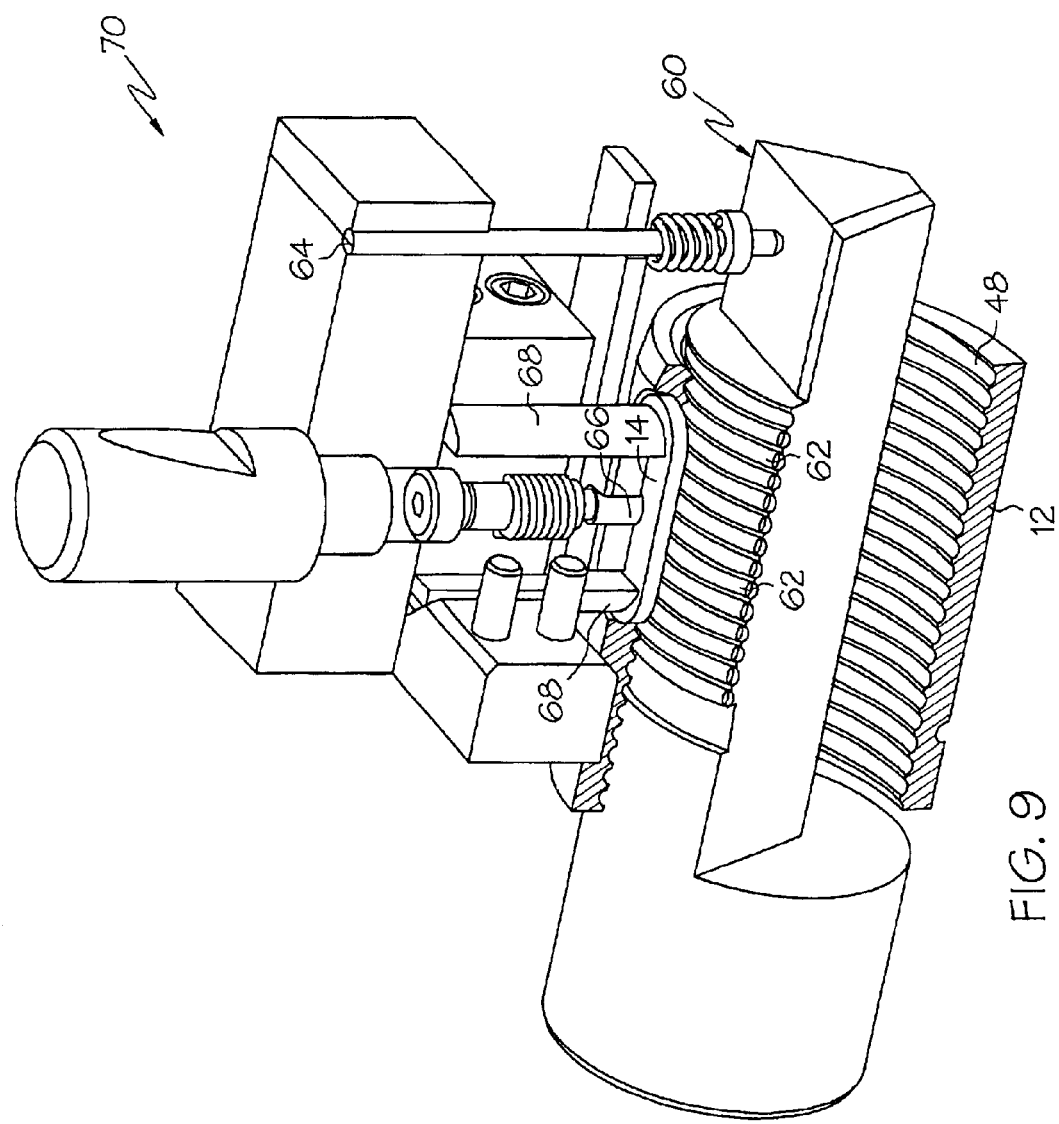
FIG. 9 is a perspective view of a first embodiment of apparatus used in the method of FIG. 8 and of a ball nut (with portions cutaway) and a crossover member both aligned on the locating arbor of the apparatus.

In one example, the first method also includes after step a) and before step c) the step of aligning the ball nut 12 on a locating arbor 60 (seen in FIG. 9) which simulates balls placed around a ball screw. In one variation, the locating arbor 60 has locating wires 62 soldered into the outside helical groove of a ball-screw-shaped portion of the locating arbor 60 which simulate balls placed around a ball screw. In one modification, the locating wires 62 define only partial arcs so that the ball nut 12 can be axially positioned over the locating wires 62 (without having to be threaded onto them) and then aligned by having the inside helical groove 48 of the ball nut 12 engage the locating wires 62. In one application, step c) includes aligning the crossover member 14 on the locating arbor 60. When using the locating wires 62, alignment of the crossover member 14 is accomplished by engaging the crossover grooves 40 with the locating wires 62. In one arrangement, the first method also includes between steps c) and d) the step of checking the radial position of the crossover member 14 with a position indicator 64. In the same or different arrangement, the first method also includes between steps c) and d) the step of clamping the crossover member 14 against the locating arbor 60 such as with a spring-loaded clamp 66. In one construction, step d) includes using a stake punch (two stake punches 68 are shown in FIG. 9). It is noted that the stake punch 68 will leave indentations on the outward-facing surface 38 of the crossover member 14 and that such indentations have been omitted from the figures for clarity. The locating arbor 60 (including the locating wires 62), the position indicator 64, the clamp 66, and the stake punch 68 are components of apparatus 70 for making the ball-nut assembly 10.

Several benefits and advantages are derived from one or more of the first method and the first and second expressions of a first embodiment of the invention. The example which includes the locating arbor, which simulates balls placed around a ball screw for proper alignment of the crossover member on the ball nut, enables close assembly tolerances for inexpensive components that can be manufactured with loose part tolerances, as can be appreciated by those skilled in the art. Once properly aligned, the example which includes the stake punch deforms and stakes the crossover member to the undercut wall of the ball nut to maintain the crossover member in proper aligned attachment to the ball nut for smooth operation of a ball-screw-and-ball-nut assembly.

The foregoing description of a method and several expressions of an embodiment of the invention has been presented for purposes of illustration. It is not intended to be exhaustive or to limit the invention to the precise form disclosed, and obviously many modifications and variations are possible in light of the above teaching. It is intended that the scope of the invention be defined by the claims appended hereto.

What is claimed is:

1. A method for making a ball-nut assembly comprising the steps of:
   a) obtaining a ball nut including a radial through slot and including an outer surface having a first portion, having a ledge radially recessed from the first portion and at least partially bounding the through slot, and having an undercut wall connecting the ledge and the first portion;
   b) obtaining a crossover member having a flange and a crossover-grooved portion, wherein the crossover portion includes at least one crossover groove;
   c) disposing the crossover member from outside the ball nut to have the flange supported against radially-inward movement by the ledge and the crossover-grooved portion disposed in the through slot with every part of every crossover groove of the crossover-grooved portion disposed radially inward of the ledge; and
   d) after step c), transversely and ductilely elongating the flange creating a staked portion of the flange which contacts the undercut wall of the outer surface of the ball nut.

2. A method for making a ball-nut assembly comprising the steps of:
   a) obtaining a ball nut including a radial through slot and including an outer surface having a first portion, having a ledge radially recessed from the first portion and at least partially bounding the through slot, and having an undercut wall corinocting the ledge and the first portion;
   b) obtaining a crossover member having a flange and a crossover-grooved portion;
   c) disposing the crossover member from outside the ball nut to have the flange supported by the ledge and the crossover-grooved portion disposed in the through slot;
   d) deforming the flange creating a staked portion of the flange which contacts the undercut wall of the outer surface of the ball nut; and
   e) after step a) and before step c), aligning the ball nut on a locating arbor which simulates balls placed around a ball screw.

3. The method of claim 2, wherein step c) includes aligning the crossover member on the locating arbor.

4. The method of claim 3, also including between steps c) and d) the step of checking the radial position of the crossover member with a position indicator.

5. The method of claim 3, also including between steps c) and d) the step of clamping the crossover member against the locating arbor.

6. The method of claim 3, wherein step d) includes using a stake punch.

* * * * *